(12) United States Patent
Kobayashi et al.

(10) Patent No.: US 6,878,461 B2
(45) Date of Patent: Apr. 12, 2005

(54) SURFACE TREATMENT STRUCTURE, CONTACT, SLIDING, FITTING-IN AND ORNAMENTAL MEMBERS, AND METHOD FOR MANUFACTURING THE SAME

(75) Inventors: Heihachi Kobayashi, Saitama (JP); Masato Takeshita, Saitama (JP); Minori Sugi, Saitama (JP)

(73) Assignee: Tsuneki Metal Plating Industries Co., Ltd., Tokyo (JP)

( * ) Notice: Subject to any disclaimer, the term of this patent is extended or adjusted under 35 U.S.C. 154(b) by 253 days.

(21) Appl. No.: 10/137,284

(22) Filed: May 3, 2002

(65) Prior Publication Data

US 2003/0207149 A1 Nov. 6, 2003

(51) Int. Cl.⁷ ............................. B32B 15/00; C25D 7/00
(52) U.S. Cl. .................... 428/614; 428/609; 428/672; 428/675; 428/680; 205/109; 427/125
(58) Field of Search ................. 428/609, 612, 428/614, 636, 670, 672, 673, 680, 675, 323, 935, 927; 205/109; 439/886; 200/265, 266; 427/125, 97.1

(56) References Cited

U.S. PATENT DOCUMENTS 4,950,176 A * 8/1990 Cocco et al. ............... 439/344
5,129,143 A * 7/1992 Wei et al. .................... 29/885
6,203,936 B1 * 3/2001 Cisar et al. .................. 429/44
6,274,254 B1 * 8/2001 Abys et al. ................ 428/670

FOREIGN PATENT DOCUMENTS

| JP | 57-016197 | * | 1/1982 |
| JP | 2001-123292 | * | 5/2001 |
| JP | 2001-342593 | * | 12/2001 |

* cited by examiner

Primary Examiner—John J. Zimmerman
(74) Attorney, Agent, or Firm—Sughrue Mion, PLLC (57) ABSTRACT

There is provided contact, sliding, fitting-in and ornamental members having a surface treatment structure in which contact resistance is low, and lubricating property and wear resistance are excellent, and capable of being used suitably for any use of contact, sliding, fitting-in or ornament, and a method for manufacturing the same. The surface treatment structure 1 having a plating layer formed on the surface of a substrate 2 comprises a lubrication plating layer 5 made of a plating layer of a metal matrix containing fine particles 4 having lubricating property, and a noble metal plating layer 7 formed on the lubrication plating layer 5. Preferably, an anti-diffusive plating layer 3 made of a metal plating layer is formed under the lubrication plating layer 5, and a joining layer 6 made of a strike plating layer of noble metal is formed between the lubrication plating layer 5 and the noble metal plating layer 7.

6 Claims, 6 Drawing Sheets

SURFACE TREATMENT STRUCTURE, CONTACT, SLIDING, FITTING-IN AND ORNAMENTAL MEMBERS, AND METHOD FOR MANUFACTURING THE SAME

BACKGROUND OF THE INVENTION

1. Field of the Invention

The present invention relates to a surface treatment structure in which contact resistance is low and lubricating property and corrosion resistance are excellent, contact, sliding, fitting-in and ornamental members, and a method for manufacturing the same.

2. Related Art Statement

Conventionally, noble metal such as Au, Ag and the like has the characteristics the electric resistance is low, contact resistance performance is excellent and the noble metal is chemically inactive, and therefore the noble metal has been extensively used as contact members in which a plating layer such as Ni is formed on a substrate having conductivity, and a plating layer of noble metal such as Au, Ag and the like is formed on the plating layer.

Further, the noble metal such as Au, Ag and the like is high in rarity and excellent in metal luster, and therefore has been used, in addition to the above-described use as the contact member, also as an ornamental member in which a plating layer of noble metal is formed on an inexpensive substrate such as Fe.

The noble metal such as Au, Ag and the like has the merit as mentioned above, but on the other hand, poses a problem that it lacks in lubricating properties and wear resistance such that when the plating layer of noble metal is slidably moved for a long period of time, the thickness of the plating layer becomes thin due to the wear of the plating layer, and is not suitable for use as a sliding member or a fitting-in member.

On the other hand, as a sliding member or a fitting-in member which is excellent in lubricating property and wear resistance, there has been known, as disclosed in Japanese Patent Application Laid Open No. Hei 6 (1994)-308575 Specification, a member wherein a composite plating layer in which particles having a low coefficient of friction such as PTFE (polytetrafluoroethylene) are eutectoid-diffused in a metal matrix such as a Ni simple substance or a Ni alloy is formed on the metal substrate.

Such a composite plating layer as described has excellent lubricating property and wear resistance, but on the other hand, poses a problem that the electric resistance is so large that it is unsuitable for a contact member.

SUMMARY OF THE INVENTION

From the foregoing, the present invention has been accomplished in order to overcome the above-described problem, and an object of the invention is to provide contact, sliding, fitting-in and ornamental members having a surface treatment structure in which contact resistance is low and lubricating property and wear resistance are excellent, and capable of being suitably used for any use of contact, sliding, fitting-in and ornament, and a method for manufacturing the same.

For solving the above-described tasks, the surface treatment structure according to the present invention is a surface treatment structure having a plating layer formed on the surface of a substrate, comprising a lubrication plating layer comprising a plating layer of a metal matrix containing fine particles having lubricating property, and a noble metal plating layer formed on the lubrication plating layer.

Further, preferably, an anti-diffusive plating layer comprising a metal plating layer is formed under the lubrication plating layer, and a joining layer comprising a strike plating layer of noble metal is formed between the lubrication plating layer and the noble metal plating layer.

Further, the contact, sliding, fitting-in and ornamental members comprise a substrate, a lubrication plating layer formed on the substrate and comprising a plating layer of a metal matrix containing fine particles having lubricating property, and a noble metal plating layer formed on the lubrication plating layer and comprising a noble metal plating layer.

Furthermore, the method for manufacturing the contact, sliding, fitting-in and ornamental members according to the present invention includes the following steps (1) and (2):

(1) step of forming a lubrication plating layer comprising a plating layer of a metal matrix containing fine particles having lubricating property; and (2) step of forming a noble metal plating layer on the surface of the lubrication plating layer.

According to a surface treatment structure, contact, sliding, fitting-in and ornamental members, and a method for manufacturing the same as described above, fine particles having lubricating property in a metal matrix are included not only in the lubrication plating layer but also in the noble metal plating layer formed on the upper layer thereof, and part of which can be formed so as to expose from the noble metal plating layer, thus enabling to make the contact resistance low, and to improve the lubricating property and wear resistance.

It is noted that noble metal termed in the present invention refers, as a rule, general noble metal such as Au, Ag, Rh and the like, but in the form of embodiment of the invention described later, for parts to be defined again, compliance is to be made with that definition.

DETAILED DESCRIPTION OF THE INVENTION

The form of carrying out the inventions of surface treatment structure according to the present invention, contact, sliding, fitting-in and ornamental members, and method for manufacturing the same will be explained hereinafter.

Figure 1:
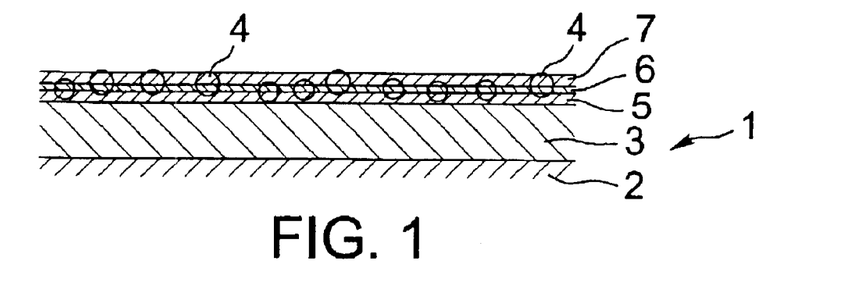
FIG. 1 is a sectional view showing the surface treatment structure according to the present invention.

As shown in FIG. 1, the surface treatment structure 1 according to the present invention comprises an anti-diffusive plating layer 3 made of a metal plating layer formed on the surface of a substrate 2, a lubrication plating layer 5 made of a plating layer of metal matrix containing fine particles 4 having lubricating property formed on the anti-diffusive plating layer 3, a joining layer 6 made of a strike plating layer of noble metal formed on the lubrication plating layer 5, and a noble metal plating layer 7 formed on the joining layer 6.

For the substrate 2, metals, ceramics or synthetic resins and the like can be used, and the shape thereof to be formed may be of a suitable shape according to the using object. Particularly, Cu or its alloy, Fe or its alloy, Zn or its alloy, Al or its alloy and the like can be suitably used.

The metal plating layer for forming the anti-diffusive plating layer 3 is to be formed merely in fixed thickness according to the material of the substrate 2 used and the kind of noble metal in order to prevent the material for forming the substrate 2 from being diffused toward the noble metal plating layer 7 or the joining layer 6 and to improve adhesive property of the lubrication plating layer 5 to the substrate 2, which metal plating layer may be formed of conventionally well-known metal such as Ni, Cu, Zn and the like, or their alloy, among them Ni, Ni—P (phosphorus) alloy, Ni—B (boron) alloy and the like can be suitably used. Further, preferably, the same material as the material of metal for the metal matrix for forming the lubrication plating layer 5 described later is used.

Further, the plating method for the anti-diffusive plating layer 3 can be done by the well-known methods such as electric plating, electroless plating and the like according to the metal material used. However, In case where Ni, Ni—P (phosphorus) alloy, or Ni—B (boron) alloy is used, the electroless plating by which the thickness is equalized easily is preferably used.

The fixed thickness of the anti-diffusive plating layer 3 differs with the material of the substrate 2 used and the kind of noble metal. For example, in case where Cu alloy and Au are used for the substrate 2 and the noble metal plating layer 7, respectively, the thickness of the anti-diffusive plating layer 3 may be of 0.5~10 µm, preferably 1~5 µm, more preferably 2~3 µm.

For the fine particles having lubricating property, materials which are small in coefficient of friction and an insulator or are high in electric resistance, or which are suitably small in coefficient of friction and are large in hardness are preferable. For example, they are preferably formed using PTFE (polytetrafluoroethylene), C (graphite), BN (boron nitride), SiC (silicon carbide) and the like, among which use of PTFE is particularly preferable.

For the particle size of the fine particles 4, 0.01~20 µm can be used, among which 0.1~10 µm are preferable, 0.2~1.0 µm are particularly preferable.

Metal used for the lubrication plating layer 5 may be of conventionally well-known metal such as Ni, Cu, Zn and the like or their alloy, among which Ni, Ni—P (phosphorus) alloy, and Ni—B (boron) alloy and the like can be suitably used.

The thickness of the lubrication plating layer 5 formed is preferably 0.01~20 µm, more preferably 0.1~5 µm, particularly 0.2~1.0 µm.

Further, the plating method for the lubrication plating layer 5 can be done by the well-known methods such as electric plating, electroless plating and the like according to the metal material used. However, in case where Ni, Ni—P alloy, and Ni—B alloy are used, the electroless plating by which the thickness is equalized easily is preferably used.

The joining layer 6 is a layer formed, before the noble metal plating layer 7 is formed on the lubrication plating layer 5, to prevent substitutional reaction and urge surface activation so as to improve adhesive strength between the lubrication plating layer 5 and the noble metal plating layer 7, the layer being formed by applying strike plating of noble metal.

As noble metal, in addition to the aforementioned known noble metal or its alloy, metal whose electric resistance, chemical stability and the like approximate to noble metal or its alloy can be used. Particularly, Au can be suitably used, and further, in this case, Au which is high in purity is preferably used.

The thickness of the joining layer 6 obtained by the strike plating is 0.01~0.5 µm, preferably 0.01~0.1 µm, particularly 0.01~0.03 µm.

Further, the joining layer 6 by way of the strike plating can be formed by the well-known plating methods such as electric plating, substitutional plating by way of electroless plating or catalytic plating and the like. In case where the strike plating is carried out by the electric plating, it is preferred that current density at energization is set to be larger than normal electric plating, for example, approximately $5A/dm^2$.

As noble metal for forming the noble metal plating layer 7, similarly to noble metal for forming the joining layer 6, in addition to the aforementioned known noble metal and its alloy, metal whose electric resistance and chemical stabilization and the like approximate to noble metal or its alloy can be used, and particularly, Au can be suitably used. Hardness of the Au plating layer 7 can be improved by containing a small quantity of Co (cobalt) or the like. For example, hardness of the Au plating layer formed by high-purity Au is normally approximately 40~50 in Vickers hardness. However, Vickers hardness can be improved to 150~200 by containing Co of approximately 0.1~0.3 mass % in the Au plating layer.

The thickness of the noble metal plating layer 7 may be formed to be 0.01~1.0 µm, preferably 0.05~1.0 µm, particularly 0.1~1.0 µm.

Further, the noble metal plating layer 7 can be formed by well-known plating methods such as electric plating, or substitutional plating by way of electroless or catalytic plating and the like.

According to the surface treatment structure 1 having the constitution as described above, the fine particles 4 having lubricating property are formed by an insulator or a member having large electric resistance as shown in FIG. 1. Therefore, in case where the noble metal plating layer 7 or the joining layer 6 is formed by the electric plating, the noble metal is not or hard to be separated on the fine particles 4, and there is formed a surface treatment structure in a state that the fine particles 4 are included in the noble metal plating layer 7 or the joining layer 6 and part of the fine particles 4 are exposed to the surface of the noble metal plating layer 7.

Further, even in case where the noble metal plating layer 7 or the joining layer 6 is formed by electroless plating, in the substitutional plating, there is a potential difference between the noble metal plating layer 7 or the joining layer 6 and the fine particles 4, and in the catalytic plating, catalytic reaction is hard to occur near the fine particles 4, whereby the noble metal is not or hard to be separated on the fine particles 4, and there is formed a surface treatment structure in a state that the fine particles 4 are included in the noble metal plating layer 7 or the joining layer 6 and part of the fine particles 4 are exposed to the surface of the noble metal plating layer 7.

Figure 2:
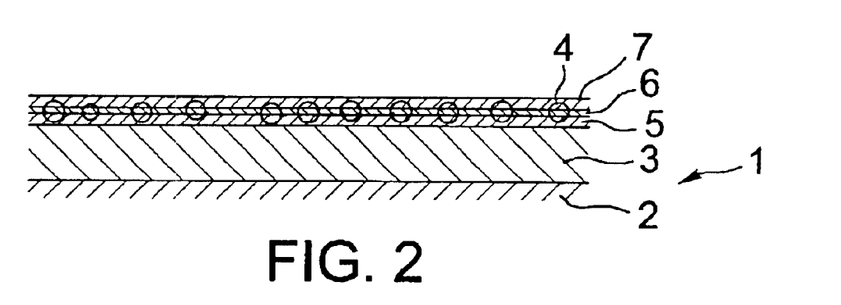
FIG. 2 is a sectional view showing a further form of the surface treatment structure shown in FIG. 1.

It is noted that the fine particles 4 having lubricating property need not be formed so that from the beginning of formation of the surface treatment structure 1, part thereof are exposed from the surface of the noble metal plating layer 7, as shown in FIG. 1, but may be formed so that they are not exposed from the surface of the noble metal plating layer 7, as shown in FIG. 2. In this case, the noble metal plating layer 7 is slidably moved for a suitable period of time, and if the thickness of the plating layer becomes thin, the fine particles 4 are exposed from the noble metal plating layer 7.

Figure 3:
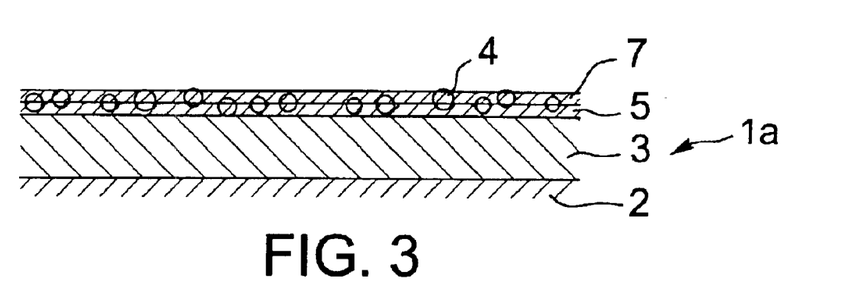
FIG. 3 is a sectional view showing the surface treatment structure different from that shown in FIG. 1.
Figure 4:
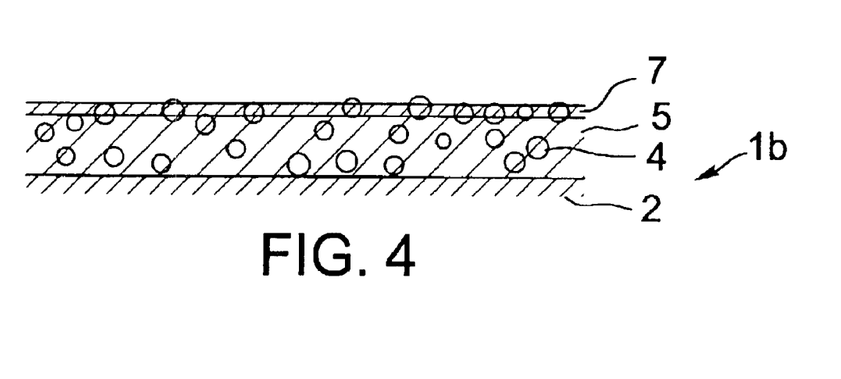
FIG. 4 is a sectional view showing the surface treatment structure different from those shown in FIGS. 1 and 3.
Figure 5:
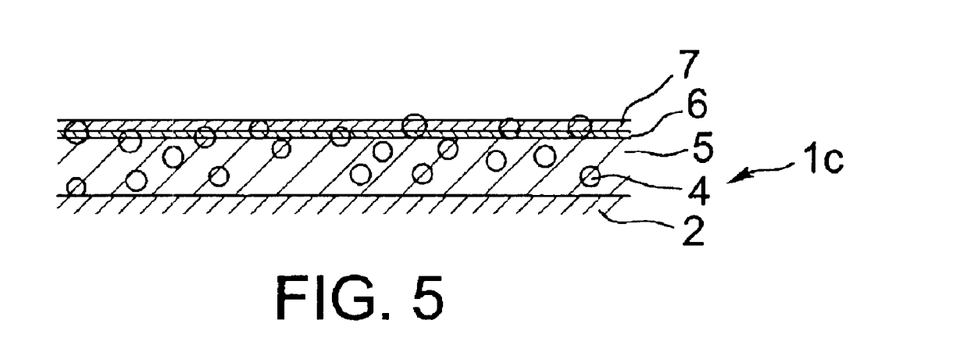
FIG. 5 is a sectional view showing the surface treatment structure different from those shown in FIGS. 1, 3 and 4.

Further, alternatively, in the surface treatment structure according to the present invention, there can be constituted as a surface treatment structure 1a wherein the anti-diffusive plating layer 3 is formed on the surface of the substrate 2, the lubrication plating layer 5 containing the fine particles 4 having lubricating property is formed on the anti-diffusive plating layer 3, and the joining layer 6 is not formed on the lubrication plating layer 5 but the noble metal plating layer 7 is formed, as shown in FIG. 3; a surface treatment structure 1b wherein the anti-diffusive plating layer 3 is not formed on the surface of the substrate 2 but the lubrication plating layer 5 containing the fine particles 4 having lubricating property is formed, and the noble metal plating layer 7 is formed on the lubrication plating layer 5, as shown in FIG. 4; and a surface treatment structure 1c wherein the lubrication plating layer 5 containing the fine particles 4 having lubricating property is formed on the surface of the substrate 2, the joining layer 6 is formed on the lubrication plating layer 5, and the noble metal plating layer 7 is formed on the joining layer 6, as shown in FIG. 5.

Preferably, the lubrication plating layer 5 in the above-described surface treatment structures 1b and 1c is formed to have the thickness of 1~10 $\mu$m in order to bring the same actions and effects as the anti-diffusive plating layer 3 bring, as shown in FIGS. 3 and 4.

The contact, sliding, fitting-in and ornamental members having the above-described surface treatment structure 1 can be manufactured by the method comprising the steps 1 to 4 as mentioned below.

That is, in the first step, plating treatment of the aforementioned conventionally well-known metal is carried out relative to the substrate 2 whose surface is applied with preliminary treatments such as degreasing, washing, activating (removal of oxidized film) or polishing to form the anti-diffusive plating layer 3 merely in adequate thickness.

Next, in the second step, lubrication plating treatment is carried out relative to the substrate 2 having the anti-diffusive plating layer 3 formed thereon using a plating liquid comprising a metal matrix containing 1~50 volume % of the fine particle 4 having lubricating property, and the lubrication plating layer 5 having 0.2~1.0 $\mu$m of thickness is formed on the anti-diffusive plating layer 3.

In case where when the fine particles 4 in the plating liquid is left, they become precipitated, preferably; a plating tank constituted so that the plating liquid is stirred for convection is used. Further, preferably, in case where the fine particles 4 tend to cohere among themselves, a diffusing agent or the like is mixed in order to prevent cohesion.

Then, in the third step, strike plating treatment by way of a noble metal plating liquid in which concentration of noble metal is adjusted to 0.5~1.5 g/l is carried out relative to the substrate 2 having the lubrication plating layer 5 formed thereon to form the joining layer 6 having 0.01~0.03 $\mu$m of thickness.

In the final fourth step, noble metal plating treatment by way of a noble metal plating liquid in which concentration of noble metal is adjusted to 2~4 g/l is carried out relative to the substrate 2 formed with the joining layer 6 to thereby form the noble metal plating layer 7 having 0.1~1.0 $\mu$m of thickness.

It is noted that the contact, sliding, fitting-in and ornamental members having the surface treatment structure 1a, the contact, sliding, fitting-in and ornamental members having the surface treatment structure 1b, and the contact, sliding, fitting-in and ornamental members having the surface treatment structure 1c can be formed by carrying out the steps except the third step out of the steps 1 to 4, by carrying out the steps except the steps 1 and 3 out of the steps 1 to 4, and by carrying out the steps except the step 1 out of the steps 1 to 4, respectively.

EXAMPLE 1

Pretreatment is applied to a brass-made plate (hereinafter referred to as Halcell plate) having the size of 100 mm×67 mm×0.5 mm, the Halcell plate is put into an electroless Ni plating liquid containing 8~10 mass % of P (phosphorus), electroless Ni plating treatment (hereinafter referred to as "Ni plating treatment") is carried out to form an anti-diffusive plating layer comprising an Ni plating layer having the thickness of 3 $\mu$m, then the Halcell plate is put into a plating liquid of Ni matrix formed by containing PTFE particles having the particle diameter of 0.2~0.5 $\mu$m into the electroless Ni plating liquid so as to have PTFE concentration of 20 volume %, electroless Ni matrix plating treatment (hereinafter referred to "lubrication plating treatment") is carried out to form a lubrication plating layer having the thickness of 0.5 $\mu$m comprising an Ni plating layer containing PTFE particles, then the Halcell plate is put into an Au plating liquid having Au concentration of 1 g/l, strike plating treatment (hereinafter referred to "Au strike treatment") is carried out with current density of 5 A/dm$^2$ to form a joining layer comprising an Au strike plating layer having the thickness of 0.03 $\mu$m, thereafter the Halcell plate is put into an Au plating liquid containing Co of 0.1 mass % with. Au concentration set to 3 g/l, and electro Au plating treatment (hereinafter referred to "Au plating treatment") is carried out to form a noble metal plating layer comprising an Au plating layer having the thickness of 0.27 $\mu$m.

COMPARATIVE EXAMPLE 1

Pretreatment is applied to a Halcell plate, Ni plating treatment is carried out relative to the Halcell plate to form a Ni plating layer having the thickness of 3 $\mu$m, then Au strike treatment is carried out to form an Au strike plating layer having the thickness of 0.03 $\mu$m, and thereafter Au plating treatment is carried out to form an Au plating layer having the thickness of 0.27 $\mu$m.

Accordingly, a difference between the COMPARATIVE EXAMPLE 1 and the EXAMPLE 1 is the presence (EXAMPLE 1) or the absence (COMPARATIVE EXAMPLE 1) of the lubrication plating layer comprising the Ni plating layer containing the PTFE particles resulting from the lubrication plating treatment.

EXAMPLE 2

Figure 6:
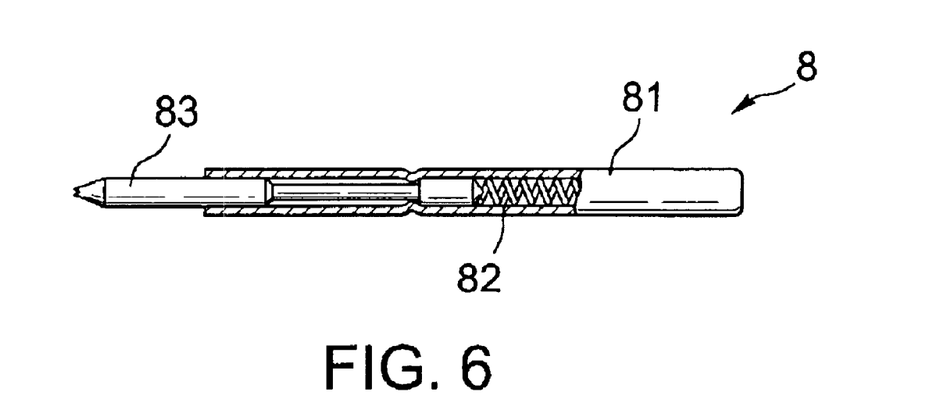
FIG. 6 is a side view (partly sectional view) showing the construction of a contact pin.

In EXAMPLE 2, as shown in FIG. 6, plating treatment is carried out relative to a contact pin 8 mounted on an examining socket used for a barn-in test of IC or the like. In this contact pin 8, a spring 82 is encased into a hollow sleeve 81 to resiliently bias a plunger 83 in an axial direction.

The sleeve 81, the spring 82 and the plunger 83 are formed by free cutting phosphor bronze (corresponding to C5391 defined in H3270 of JIS), a piano wire (corresponding to SWP-A defined in G3522 of JIS), and carbon tool steel (corresponding to SK defined in G3311 of JIS), respectively. In the present example, the contact pin 8 having the constitution as described is subjected to plating treatment as mentioned below.

After the sleeve 81 and the plunger 83 have been applied with pre-treatment, Ni plating treatment is carried out to form an anti-diffusive plating layer comprising an Ni plating layer having the thickness of 3 $\mu$m, then lubrication plating treatment is carried out to form a lubrication plating layer having the thickness of 0.5 $\mu$m comprising an Ni plating layer containing PTFE particles, next Au strike treatment is carried out to form a joining layer comprising an Au strike plating layer having the thickness of 0.03 $\mu$m, and thereafter Au plating treatment is carried out to form a noble metal plating layer comprising an Au plating layer having the thickness of 0.17 $\mu$m.

After the spring 82 has been applied with pre-treatment, Ni plating treatment is carried out to form an Ni plating layer having the thickness of 3 $\mu$m, then Au strike treatment is carried out to form an Au strike plating layer having the thickness of 0.03 $\mu$m, and then Au plating treatment is carried out to form an Au plating layer having the thickness of 0.17 $\mu$m.

COMPARATIVE EXAMPLE 2

In COMPARATIVE EXAMPLE 2, the plating treatment of the plunger 83 in the EXAMPLE 2 is changed into the plating treatment similar to the spring 82.

Accordingly, a difference between the COMPARATIVE EXAMPLE 2 and the EXAMPLE 2 is that the surface treatment structure formed on the plunger 83 has (EXAMPLE 2) or doesn't have (COMPARATIVE EXAMPLE 2) the lubrication plating layer comprising the Ni plating layer containing PTFE particles resulting from the lubrication plating treatment.

COMPARISON BETWEEN EXAMPLE 1 AND COMPARATIVE EXAMPLE 1

The contact resistance value, lubricating properties, surface roughness, solder wettability, corrosion resistance, adhesion property, and hardness of the Au plating layers in EXAMPLE 1 and COMPARATIVE EXAMPLE 1 are measured for evaluation. The measured results are shown in TABLE 1.

TABLE 1

| TEST ITEM | EXAMPLE 1 | COMPARATIVE EXAMPLE 1 |
|---|---|---|
| Contact resistance value [m$\Omega$] | 2.60 | 1.89 |
| Lubricating properties | | |
| Static-friction coefficient | 0.0512 | 0.0923 |
| Dynamic-friction coefficient | 0.0373 | 0.0715 |
| Surface roughness (Ra) [$\mu$m] | 0.0508 | 0.0111 |
| Solder wettability | Δ | ○ |
| Corrosion resistance | ⊚ | ○ |
| Adhesive properties | ○ | ○ |
| Hardness (Hv) | 190~200 | 190~200 |

Contact Resistance Value

The contact resistance values in the EXAMPLE 1 and COMPARATIVE EXAMPLE 1 were measured using a contact resistance measuring apparatus (made of K. K. Yamazaki Seiki Kenkyusho, Model: CRS-113-Au). The measuring conditions are that contact load of Au electrode is 490 mN (50 gf), applied current is 10 mA (AC 278 Hz), peak open terminal voltage is 20 mV or less, and parts measured are central portions of the surface of the Au plating layer in EXAMPLE 1 and COMPARATIVE EXAMPLE 1.

As shown in TABLE 1, the results were that EXAMPLE 1 containing PTFE particles in the Au plating layer was slightly higher in the contact resistance value than COMPARATIVE EXAMPLE 1.

Lubricating Property

The lubricating property was evaluated by the coefficient of static friction and the coefficient of dynamic friction. As a measuring apparatus, a surface-properties testing machine (made of Heidon Co., HEIDON-14DR) was used. The coefficient of dynamic friction was measured by moving it 3.0 mm at a speed of 30 mm/min while applying a load of 490 mN (50 gf) by a ball indenter made of stainless steel of $\phi$10 to the surfaces of EXAMPLE 1 and COMPARATIVE EXAMPLE 1. The coefficients of friction were represented by a mean value obtained from three times of measurements.

As shown in TABLE 1, it is understood that both the coefficient of static friction and the coefficient of dynamic friction (mean value) of the Au plating layer in EXAMPLE 1 in which PTFE particles are contained in the Au plating layer, part of which are exposed from the surface of the Au plating layer are reduced to a value about half of those of the Au plating layer in COMPARATIVE EXAMPLE 1, and the lubricating property is improved surely.

Surface Roughness

The surface roughnesses of the Au plating layers of EXAMPLE 1 and COMPARATIVE EXAMPLE 1 were measured by a measuring apparatus (SEI 1700-38D) made of Kosaka Kenkyusho Co., Ltd. on the basis of provisions of the center-line mean roughness (Ra) of JIS B0601. The measuring condition was that the surface roughness was measured when a stylus having the radius of 2 $\mu$m is moved 4 mm at feed speed of 0.5 mm/s.

As shown in TABLE 1, the result was obtained such that EXAMPLE 1 in which PTFE particles are contained in the Au plating layer, part of which are exposed from the surface of the Au plating layer was somewhat rough as compared with COMPARATIVE EXAMPLE 1.

Solder Wettability

Ones in EXAMPLE 1 and COMPARATIVE EXAMPLE 1 are dipped in a solder bath formed by fusing eutectic solder (Sn 60%, Pb 40%) to 230±5° C. for 5 seconds, and thereafter pulled up to visually confirm the shape of solder formed on the surface of the Au plating layer for decision.

As shown in TABLE 1, the result was that the Au plating layer in EXAMPLE 1 in which PTFE particles are contained in the Au plating layer, part of which are exposed from the surface of the Au plating layer is somewhat inferior in the solder wettability to the Au plating layer of COMPARATIVE EXAMPLE 1.

Corrosion Resistance

The corrosion resistances of the Au plating layers in EXAMPLE 1 and COMPARATIVE EXAMPLE 1 were measured in accordance with the provisions of the JIS Z2371 salt water spraying testing method. The test time was 96 hours.

As a result of evaluation of visually tested resultant objects, TABLE 1 shows that the Au plating layer in EXAMPLE 1 has better corrosion resistance as compared with the Au plating layer in COMPARATIVE EXAMPLE 1.

Adhesion Property

For the purpose of comparing the adhesion properties between the Halcell plates and the Au plating layers in EXAMPLE 1 and COMPARATIVE EXAMPLE 1, both side ends of the Halcell plates in EXAMPLE 1 and COMPARATIVE EXAMPLE 1 are held by tools such as a pliers, and bended till the central portion of the Halcell plate assumes an angle of approximately 90°, after which the surfaces of the Au plating layers were visually confirmed.

As shown in TABLE 1, both EXAMPLE 1 and COMPARATIVE EXAMPLE 1 were free from abnormality such as peeling, cracks and the like on the surface of the Au plating layer after the bending test, thus having the better adhesion properties.

Vickers Hardness

The hardnesses of the Au plating layers in EXAMPLE 1 and COMPARATIVE EXAMPLE 1 were measured in accordance with the provisions of Vickers hardness test of JIS Z2244.

As shown in TABLE 1, both the Au plating layers in EXAMPLE 1 and COMPARATIVE EXAMPLE 1 have values of 190~200, and no difference in Vickers hardness was found.

Comparison of Durability of the Plating Layers Between EXAMPLE 2 and COMPARATIVE EXAMPLE 2

The durability of the Au plating layers of the plunger 83 in EXAMPLE 2 and COMPARATIVE EXAMPLE 2 was evaluated, as will be mentioned below, by the results of the operation durability test in which the sleeve 81 and the plunger 83 of the contact pin 8 are slidably moved constantly, while applying the vertical repetitive load to the contact pin 8 in the fixed operating mode, during which the contact resistance values of the contact pin 8 are measured every fixed cycle. The test results of the operation durability test of EXAMPLE 2 are shown in TABLE 2 and FIG. 7, and the test results of the operation durability test of COMPARATIVE EXAMPLE 2 are shown in TABLE 3 and FIG. 8.

TABLE 2

| NUMBER OF OPERATING CYCLES | CONTACT RESISTANCE VALUE [m Ω] | | | | | | | |
|---|---|---|---|---|---|---|---|---|
| [Cycle] | Pin. 1 | Pin. 2 | Pin. 3 | Pin. 4 | Pin. 5 | Pin. 6 | Pin. 7 | Pin. 8 |
| 0 | 13 | 13 | 13 | 12 | 14 | 13 | 12 | 14 |
| 5000 | 11 | 10 | 13 | 11 | 12 | 10 | 11 | 12 |
| 10000 | 11 | 10 | 12 | 11 | 11 | 10 | 10 | 12 |
| 15000 | 11 | 11 | 14 | 11 | 12 | 11 | 10 | 11 |
| 20000 | 10 | 11 | 12 | 11 | 12 | 11 | 10 | 11 |
| 25000 | 11 | 11 | 12 | 11 | 12 | 11 | 10 | 12 |
| 30000 | 11 | 11 | 12 | 10 | 11 | 11 | 11 | 12 |
| 35000 | 10 | 10 | 11 | 10 | 11 | 11 | 10 | 11 |
| 40000 | 11 | 11 | 11 | 10 | 12 | 11 | 10 | 12 |
| 45000 | 11 | 10 | 11 | 10 | 12 | 11 | 10 | 12 |
| 50000 | 11 | 11 | 11 | 10 | 13 | 10 | 9 | 12 |
| 55000 | 11 | 11 | 11 | 10 | 12 | 11 | 10 | 11 |
| 60000 | 11 | 11 | 11 | 11 | 12 | 11 | 9 | 12 |
| 65000 | 11 | 11 | 11 | 10 | 12 | 11 | 10 | 12 |
| 70000 | 11 | 11 | 11 | 13 | 13 | 11 | 10 | 11 |
| 75000 | 12 | 11 | 11 | 11 | 12 | 11 | 10 | 11 |
| 80000 | 12 | 11 | 11 | 11 | 12 | 11 | 10 | 11 |
| 85000 | 11 | 11 | 11 | 11 | 12 | 11 | 10 | 11 |
| 90000 | 11 | 11 | 11 | 11 | 12 | 11 | 10 | 12 |
| 95000 | 12 | 11 | 11 | 11 | 13 | 11 | 10 | 11 |
| 100000 | 12 | 11 | 11 | 11 | 12 | 11 | 10 | 12 |
| 105000 | 12 | 11 | 11 | 11 | 13 | 11 | 10 | 12 |
| 110000 | 12 | 11 | 11 | 11 | 12 | 12 | 10 | 12 |
| 115000 | 12 | 11 | 11 | 11 | 14 | 11 | 10 | 13 |
| 120000 | 12 | 11 | 11 | 13 | 13 | 12 | 10 | 13 |
| 125000 | 12 | 11 | 11 | 11 | 13 | 11 | 10 | 13 |
| 130000 | 12 | 11 | 11 | 11 | 13 | 12 | 10 | 12 |
| 135000 | 12 | 11 | 11 | 11 | 12 | 11 | 10 | 12 |
| 140000 | 12 | 11 | 11 | 11 | 12 | 11 | 10 | 13 |
| 145000 | 12 | 11 | 11 | 11 | 13 | 12 | 10 | 13 |
| 150000 | 12 | 11 | 11 | 12 | 13 | 12 | 10 | 13 |
| 155000 | 12 | 12 | 11 | 12 | 13 | 12 | 10 | 12 |
| 160000 | 12 | 12 | 11 | 11 | 14 | 12 | 10 | 13 |
| 165000 | 12 | 12 | 11 | 11 | 14 | 12 | 11 | 13 |
| 170000 | 12 | 11 | 11 | 11 | 14 | 13 | 10 | 13 |
| 175000 | 12 | 11 | 11 | 11 | 14 | 12 | 10 | 13 |
| 180000 | 12 | 11 | 11 | 11 | 13 | 12 | 10 | 14 |
| 185000 | 12 | 11 | 11 | 11 | 11 | 11 | 10 | 13 |
| 190000 | 12 | 12 | 11 | 11 | 11 | 12 | 10 | 14 |
| 195000 | 12 | 11 | 11 | 12 | 12 | 11 | 10 | 14 |
| 200000 | 12 | 11 | 11 | 11 | 11 | 11 | 10 | 14 |

TABLE 3

| NUMBER OF OPERATING CYCLES [Cycle] | CONTACT RESISTANCE VALUE [m Ω] | | | | | | | |
|---|---|---|---|---|---|---|---|---|
| | Pin. 1 | Pin. 2 | Pin. 3 | Pin. 4 | Pin. 5 | Pin. 6 | Pin. 7 | Pin. 8 |
| 0 | 12 | 15 | 20 | 13 | 13 | 14 | 12 | 15 |
| 5000 | 12 | 15 | 25 | 13 | 13 | 14 | 12 | 14 |
| 10000 | 14 | 14 | 21 | 14 | 13 | 13 | 14 | 18 |
| 15000 | 30 | 18 | 24 | 15 | 14 | 13 | 30 | 18 |
| 20000 | 110 | 18 | 28 | 34 | 13 | 14 | 109 | 36 |
| 25000 | 103 | 20 | 80 | 49 | 13 | 15 | 120 | 43 |
| 30000 | 104 | 22 | 87 | 102 | 14 | 13 | 123 | 23 |
| 35000 | 124 | 33 | 83 | 119 | 34 | 13 | 118 | 43 |
| 40000 | 200 | 65 | 27 | 42 | 34 | 14 | 235 | 45 |
| 45000 | 210 | 220 | 26 | 32 | 32 | 14 | 201 | 46 |
| 50000 | 107 | 45 | 26 | 18 | 35 | 13 | 132 | 32 |
| 55000 | 106 | 46 | 27 | 17 | 36 | 13 | 153 | 35 |
| 60000 | 66 | 32 | 28 | 19 | 43 | 14 | 56 | 34 |
| 65000 | 30 | 35 | 29 | 108 | 45 | 15 | 26 | 13 |
| 70000 | 40 | 34 | 22 | 165 | 46 | 15 | 54 | 13 |
| 75000 | 20 | 22 | 23 | 102 | 44 | 16 | 200 | 45 |
| 80000 | 20 | 23 | 34 | 189 | 43 | 14 | 264 | 46 |
| 85000 | 20 | 22 | 38 | 190 | 57 | 13 | 21 | 23 |
| 90000 | 200 | 21 | 24 | 119 | 54 | 13 | 34 | 24 |
| 95000 | 202 | 21 | 21 | 123 | 101 | 13 | 18 | 23 |
| 100000 | 20 | 23 | 28 | 120 | 98 | 13 | 19 | 32 |
| 105000 | 20 | 24 | 36 | 109 | 89 | 45 | 18 | 24 |
| 110000 | 30 | 22 | 31 | 131 | 208 | 46 | 40 | 25 |
| 115000 | 100 | 24 | 120 | 132 | 108 | 32 | 68 | 23 |
| 120000 | 60 | 22 | 102 | 129 | 76 | 35 | 18 | 24 |
| 125000 | 17 | 21 | 113 | 117 | 56 | 34 | 18 | 43 |
| 130000 | 19 | 34 | 108 | 123 | 54 | 15 | 75 | 42 |
| 135000 | 71 | 132 | 278 | 152 | 63 | 14 | 56 | 37 |
| 140000 | 27 | 22 | 269 | 178 | 43 | 102 | 23 | 118 |
| 145000 | 73 | 25 | 259 | 160 | 123 | 121 | 22 | 119 |
| 150000 | 24 | 18 | 121 | 320 | 141 | 17 | 43 | 123 |
| 155000 | 51 | 32 | 298 | 324 | 30 | 17 | 47 | 112 |
| 160000 | 48 | 55 | 178 | 332 | 48 | 16 | 50 | 124 |
| 165000 | 37 | 90 | 132 | 264 | 48 | 15 | 22 | 15 |
| 170000 | 20 | 29 | 112 | 234 | 32 | 14 | 23 | 13 |
| 175000 | 185 | 27 | 108 | 302 | 43 | 14 | 45 | 13 |
| 180000 | 32 | 523 | 106 | 293 | 49 | 13 | 45 | 14 |
| 185000 | 53 | 302 | 121 | 276 | 12 | 14 | 23 | 14 |
| 190000 | 28 | 69 | 145 | 301 | 21 | 15 | 32 | 14 |
| 195000 | 72 | 110 | 132 | 302 | 13 | 15 | 23 | 15 |
| 200000 | 57 | 231 | 132 | 290 | 13 | 16 | 41 | 14 |

Figure 9:
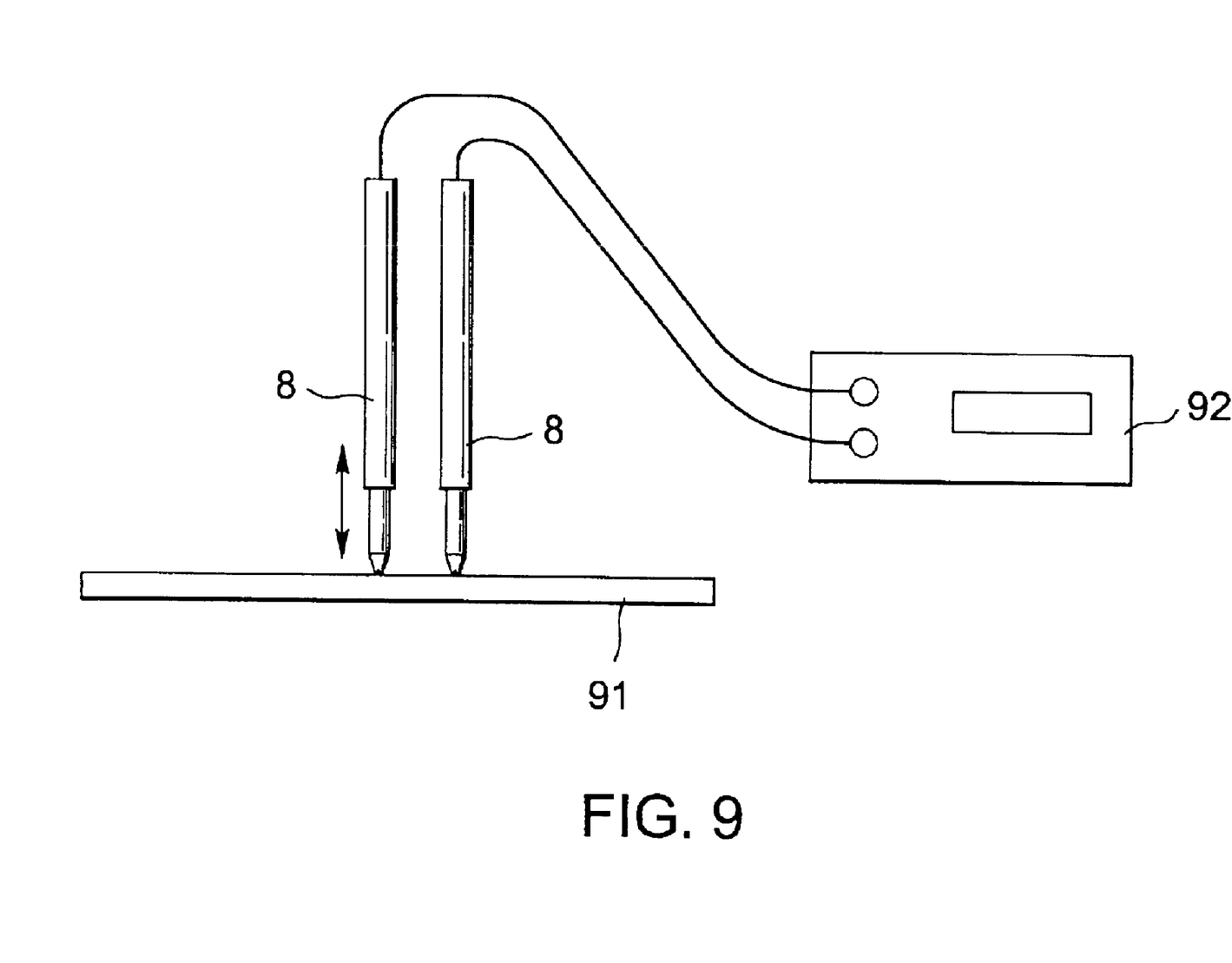
FIG. 9 is a schematic view showing the schematic construction of the operation durability test.

The operating durability test was conducted in a manner such that as shown in FIG. 9, the contact pin 8 of EXAMPLE 2 or COMPARATIVE EXAMPLE 2 is vertically supported on an Au plating laminate plate 91, and is connected to a stroke measuring apparatus 92, assuming a state that it may be vertically moved while measuring the stroke amount, a downward fixed amount of load is applied to the contact pin 8 and stroked approximately 4 mm, after which the downward load is released, and returning of the contact pin 8 to its natural length is set to be one cycle, which cycle is repeated 450 cycles per minute.

Figure 10:
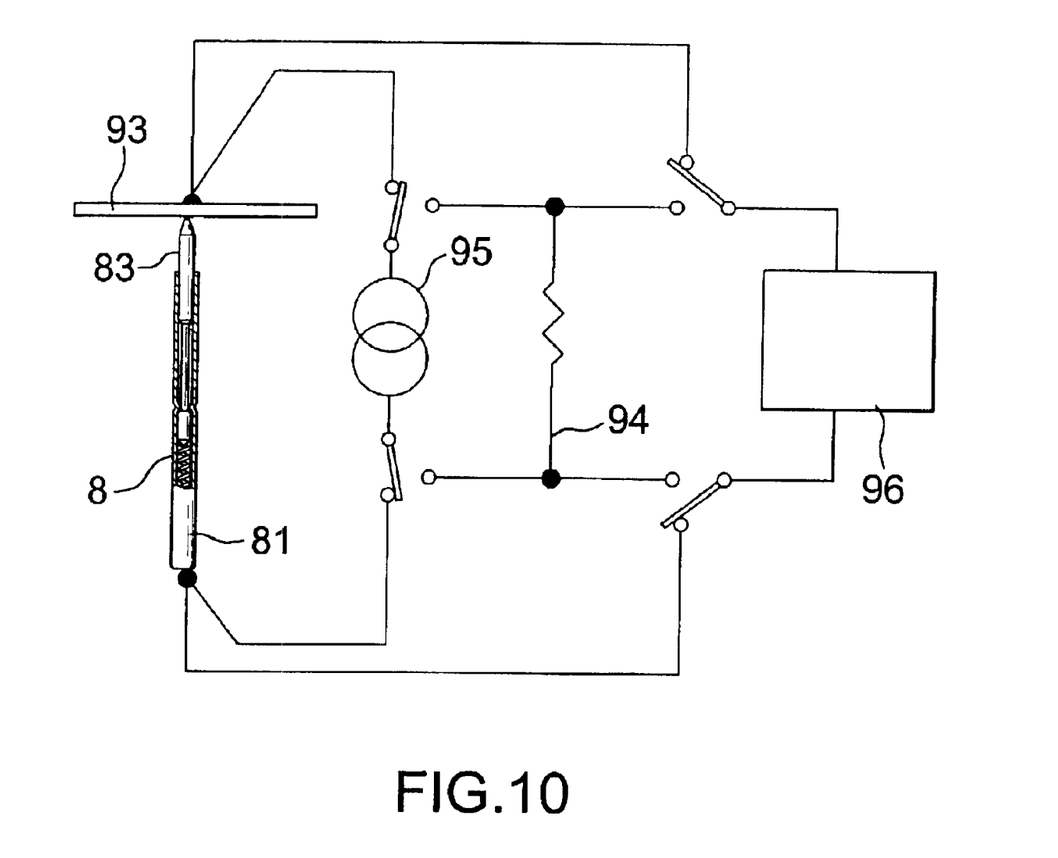
FIG. 10 is a schematic view showing the method for measuring contact resistance.

The contact resistance values were calculated in a manner such that the contact pin 8 is removed from the operation testing apparatus before test and every 5000 cycle after start of test, and as shown in FIG. 10, the extreme end of the plunger 83 is placed in contact with a contact plate 93 formed from a plate made of Ag, a load of 2156 mN (220 gf) is applied, a constant current source 95 adjusted to output a constant current of 10 mA by a shunt resistor 94 having a known resistance value is connected between the extreme end of the sleeve 81 and the contact plate 93, and a voltage drop value therebetween is measured by a volt meter 96.

Figure 7:
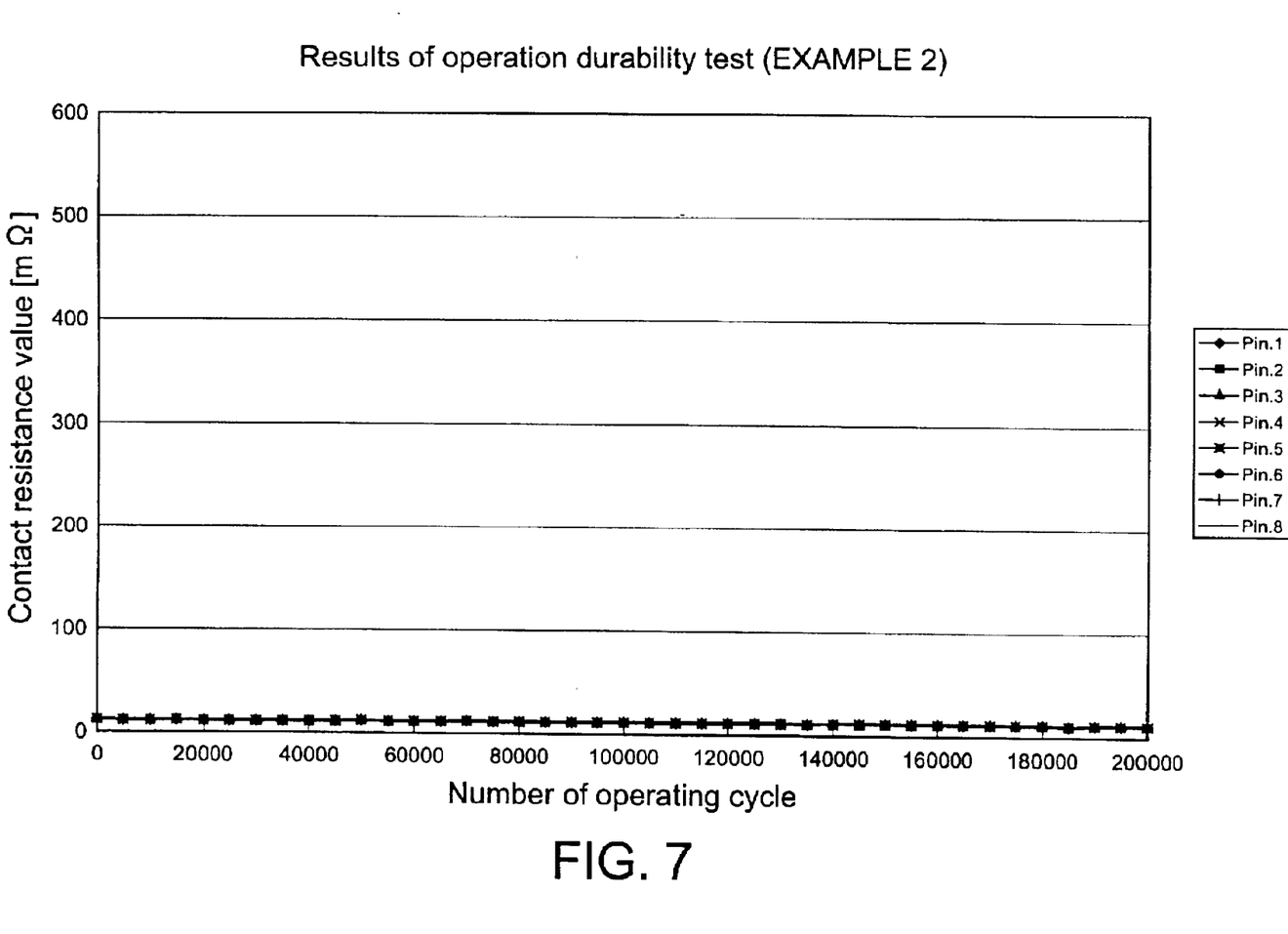
FIG. 7 is a graph showing the results of an operation durability test of the contact pin having the surface treatment structure according to the present invention.
Figure 8:
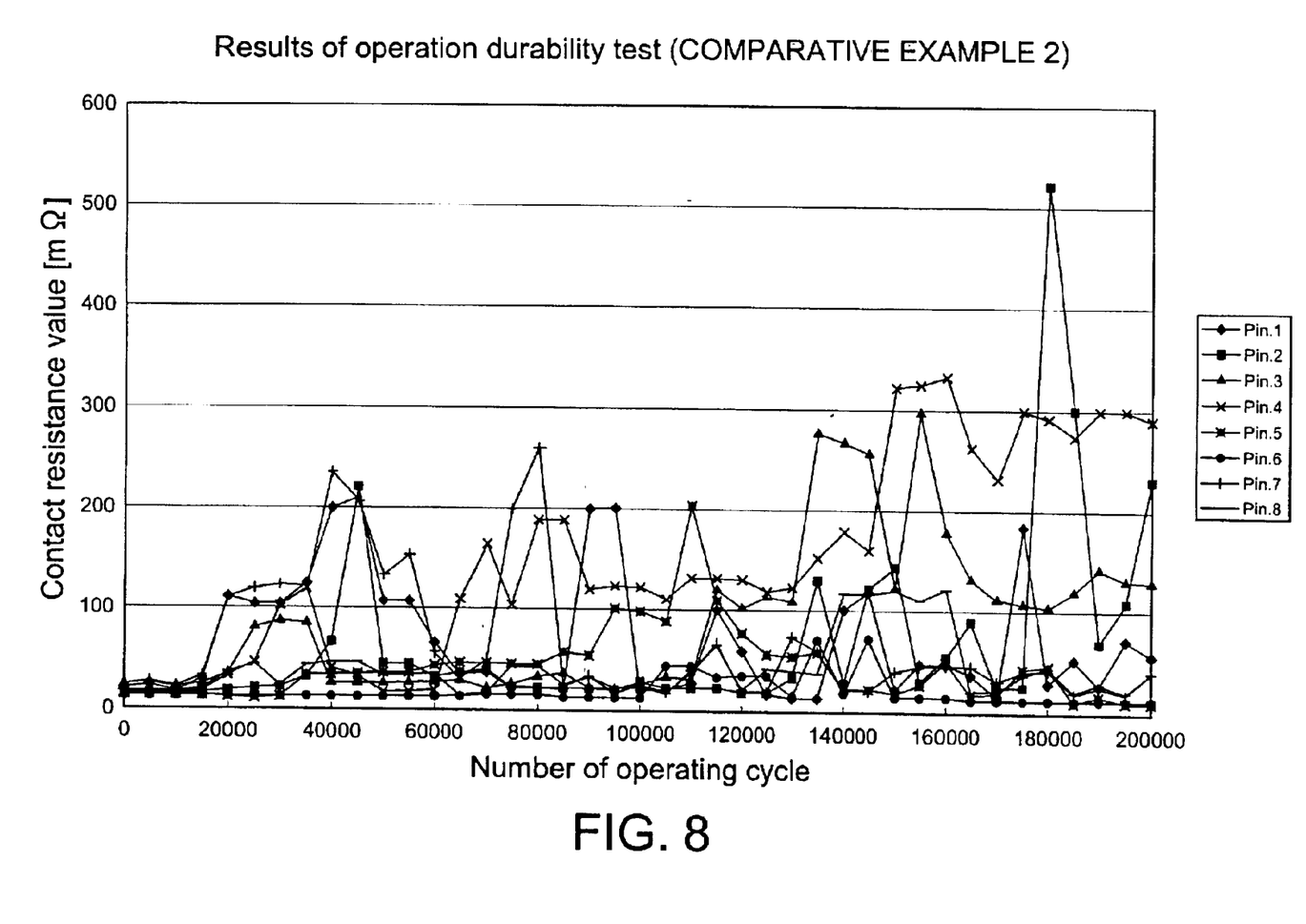
FIG. 8 is a graph showing the results of an operation durability test of the contact pin having the conventional surface treatment structure.

As the result of the above-described tests, as shown in TABLES 3, 4 and FIGS. 7, 8, in the sample of EXAMPLE 2, the contact resistance value after operation of 200000 cycle indicates approximately the same value as the initial value, and even in the middle of the operating cycle, no change is made, whereas in the sample of COMPARATIVE EXAMPLE 2, the end value thereof is greatly increased as compared with the initial value, or the contact resistance value tends to be changed greatly. It is understood therefrom that the durability in EXAMPLE 2 becomes greatly improved as compared with that in COMPARATIVE EXAMPLE 2.

What is claimed is:

1. A contact member comprising:
   a substrate,
   a lubrication plating layer of 0.2~1.0 μm in thickness formed on said substrate and comprising a plating layer of a metal matrix made of Ni or Ni alloy containing fine particles made of PTPE (Polytetrafluoroethylene) of 0.2~1.0 μm in diameter having lubricating property, small coefficient of friction and high electric resistance so as to have a PTPE concentration of 1~50 volume % and
   a noble metal plating layer of 0.1~1.0 μm in thickness formed on said lubrication plating layer and comprising a Au plating layer containing Co so as to have a Co concentration of 0.1~0.3 mass %.

2. The contact member according to claim 1, wherein an anti-diffusive plating layer, comprising a metal plating layer, is formed between said substrate and said lubrication plating layer.

3. The contact member according to claim 1 or 2, wherein a joining layer, comprising a strike plating layer of noble metal, is formed between said lubrication plating layer and said noble metal plating layer.

4. A method for manufacturing a contact member comprising the following steps:
   (1) forming a lubrication plating layer of 0.2~1.0 μm in thickness comprising a plating layer of a metal matrix made of Ni or it's alloy containing fine particles made of PTPE (Polytetrafluoroethylene) of 0.2~1.0 μm in diameter having lubricating property, small coefficient of friction and high electric resistance so as to have a PTPE concentration of 1~50 volume % on the surface of a substrate; and
   (2) forming a noble metal plating layer of 0.1~1.0 μm in thickness comprising an Au plating layer containing Co so as to have a Co concentration of 0.1~0.3 mass % on the surface of the lubrication plating layer.

5. The method for manufacturing a contact member, according to claim 4, wherein in said Step (1), after an anti-diffusive plating layer comprising a metal plating layer has been formed on the surface of said substrate, a lubrication plating layer of 0.2~1.0 μm in thickness comprising a plating layer of a metal matrix made of Ni or Ni alloy, containing fine particles made of PTPE of 0.2~1.0 μm in diameter having lubricating property, small coefficient of friction and high electrical resistance, is formed.

6. The method for manufacturing a contact member, according to claim 4 or 5, wherein between said Steps (1) and (2), there is the Step of forming a joining layer comprising a strike plating layer of noble metal on the surface of said lubrication plating layer.

* * * * *